(12) United States Patent
Martins Vieira Filho

(10) Patent No.: US 11,369,865 B2
(45) Date of Patent: Jun. 28, 2022

(54) MICROPROCESSED ELECTRONIC DEVICE FOR PRODUCING SPECIAL EFFECTS BY CONTROLLING AND SYNCHRONIZING LIGHT AND SOUND

(71) Applicant: Gilson Martins Vieira Filho, Belo Horizonte (BR)

(72) Inventor: Gilson Martins Vieira Filho, Belo Horizonte (BR)

( * ) Notice: Subject to any disclaimer, the term of this patent is extended or adjusted under 35 U.S.C. 154(b) by 177 days.

(21) Appl. No.: 16/769,172

(22) PCT Filed: Dec. 20, 2018

(86) PCT No.: PCT/BR2018/050471
§ 371 (c)(1),
(2) Date: Jun. 2, 2020

(87) PCT Pub. No.: WO2019/119096
PCT Pub. Date: Jun. 27, 2019

(65) Prior Publication Data
US 2021/0197072 A1    Jul. 1, 2021

(30) Foreign Application Priority Data

Dec. 22, 2017  (BR) .......................... 1020170278298
Sep. 27, 2018  (BR) .......................... 1320180698795
Dec. 12, 2018  (BR) .......................... 1320180758623

(51) Int. Cl.
*A63F 9/24*        (2006.01)
*H04M 1/72412*     (2021.01)
*G09G 5/12*        (2006.01)

(52) U.S. Cl.
CPC .................. *A63F 9/24* (2013.01); *G09G 5/12* (2013.01); *H04M 1/72412* (2021.01);
(Continued)

(58) Field of Classification Search
USPC .......................................................... 463/30
See application file for complete search history.

(56) References Cited

U.S. PATENT DOCUMENTS 5,853,327 A    12/1998  Gilboa
5,855,483 A *   1/1999  Collins ................. A63F 13/235
                                                434/307 R
(Continued)

OTHER PUBLICATIONS

English translation provided by IB of the International Search Report dated Mar. 7, 2019 on the related International Application of No. PCT/BR2018/050471 filed on Dec. 20, 2018.

*Primary Examiner* — Pierre E Elisca
(74) *Attorney, Agent, or Firm* — Mardson Q McQuay

(57) ABSTRACT

"MICROCONTROLLER-CONTROLLED ELECTRONIC DEVICE FOR THE PRODUCTION OF SPECIAL EFFECTS THROUGH THE CONTROL AND SYNCHRONIZATION OF LIGHT AND SOUND" is an electronic device with a microcontroller that by controlling the brightness and color of RGB LEDs, which will illuminate the game surface, along with the an audio device control, such as an MP3 player, reproduces several special light and sound effects synchronically. In its complete version, it is comprised of a microcontroller, which controls four RGB LEDs and an MP3 player module connected to a memory, which generate the light and sound effects, synchronically. It also has a data communication module as well as an audio communication module, thus enabling the device in question to be utterly controlled by apps installed on mobile devices through a wireless connection.

18 Claims, 8 Drawing Sheets

(52) U.S. Cl.
CPC ... *A63F 2009/243* (2013.01); *A63F 2009/247* (2013.01); *A63F 2009/2454* (2013.01); *A63F 2009/2489* (2013.01)

(56) References Cited

U.S. PATENT DOCUMENTS

| | | | |
|---|---|---|---|
| 6,252,581 B1 * | 6/2001 | Fukazawa | G09G 1/285 |
| | | | 345/600 |
| 7,687,744 B2 | 3/2010 | Walter et al. | |
| 9,849,369 B2 | 12/2017 | Maharbiz et al. | |
| 2003/0067115 A1 | 4/2003 | Nordgren et al. | |
| 2006/0223637 A1 * | 10/2006 | Rosenberg | A63F 13/53 |
| | | | 463/47 |
| 2008/0200233 A1 * | 8/2008 | Aida | G07F 17/3211 |
| | | | 463/20 |
| 2009/0129604 A1 * | 5/2009 | Enamito | H04S 7/302 |
| | | | 381/122 |
| 2011/0115979 A1 * | 5/2011 | Aoki | H04S 3/00 |
| | | | 348/602 |
| 2012/0052934 A1 * | 3/2012 | Maharbiz | A63F 13/98 |
| | | | 463/9 |
| 2014/0253478 A1 * | 9/2014 | Jeong | G06F 3/041 |
| | | | 345/173 |
| 2019/0243661 A1 * | 8/2019 | Jung | G06F 9/4405 |

\* cited by examiner

MICROPROCESSED ELECTRONIC DEVICE FOR PRODUCING SPECIAL EFFECTS BY CONTROLLING AND SYNCHRONIZING LIGHT AND SOUND

DESCRIPTION OF RELATED ART

Synched light and sound special effects and music have always been used extensively on television so as to boost viewers' immersion thus providing them with more excitement when watching films. The same technique is utilized in video games.

Moreover, in board games, many players use various resources with a view to creating a more suitable environment, thus increasing immersion and consequently leading to a significant rise in amusement. There are several features to the current invention such as playing in a dark environment with candlelight, playing horror songs in stereos/music systems, using sound effects apps on the cellphone or even apps created by the board game manufacturers themselves to be used on computers and cell phones. Nevertheless, as such resources do not have light effects projected over the game board synchronically with the sound, they are scarce and even hazardous (e.g. candle lighting), they are not able to attain that objective.

The American patent US 20030067115 A1—Game played in a darkened room—describes a board game that is lit by a monochromatic light source, which when changing color, through a switch, produces visual changes in the game board pictures and cards. This game also does not raise the players' immersion, because it does not produce light effects projected over the game board synchronically with sound effects. (The patent has been cited here for reference purposes only).

BRIEF DESCRIPTION OF THE DRAWINGS

The invention can be better understood through the detailed description presented below, in line with the attached figures, wherein.

DETAILED DESCRIPTION

The present patent refers to a microcontroller-controlled electronic device, which by controlling the brightness and color of RGB LEDs (which will illuminate the game board in a darkened room), coupled with audio control, such as MP3 player, reproduces several special light and sound effects, all of which are synched, such as: rain with lightning and thunder, matchstick striking, a flickering candle flame, a camera shutter sound, etc . . . , creating a more appropriate environment and increase immersion and, consequently, the enjoyment of playing board games, cards, RPG, etc. . . .

Figure 1:
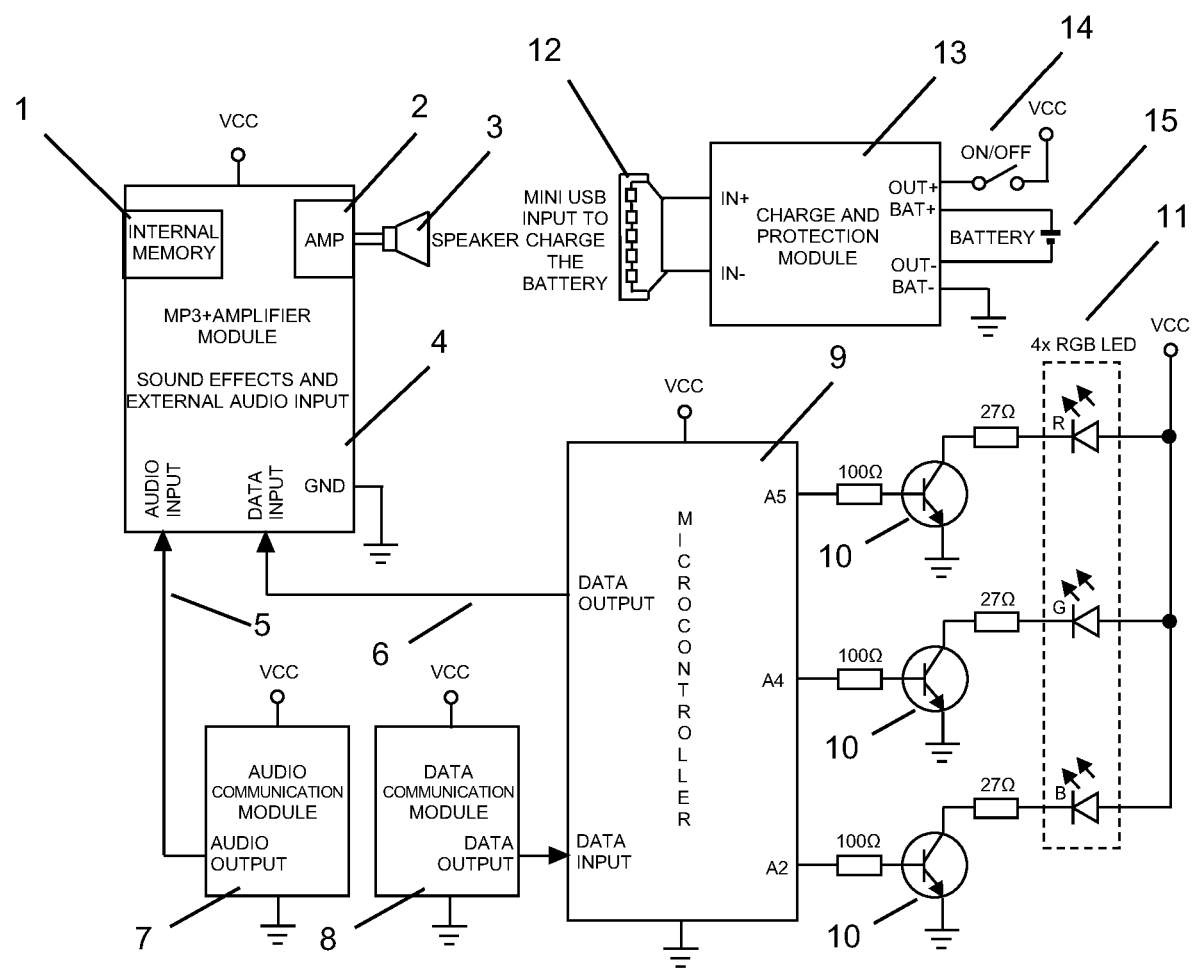
FIG. 1 represents a block diagram of the claimed electronic device in its full version.
Figure 2:
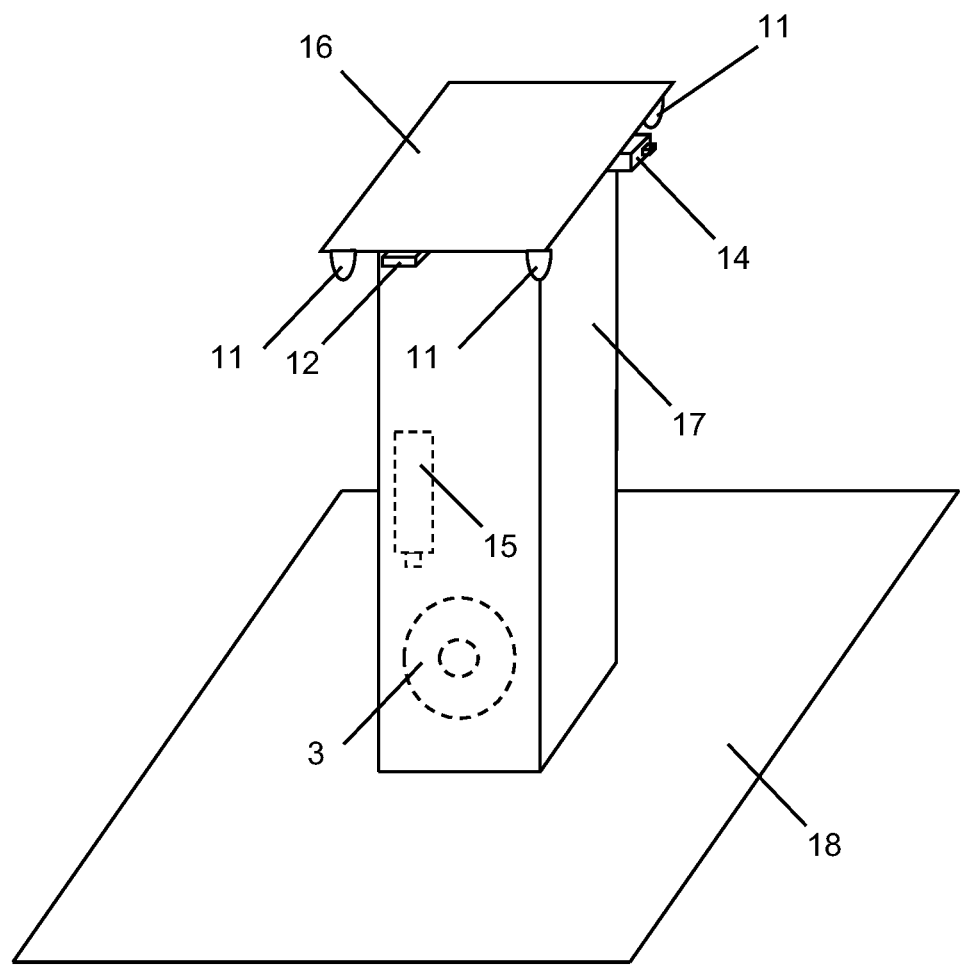
FIG. 2 represents a perspective view of the claimed electronic device, in its full version, depicting a suggestion for its positioning on a game board to be illuminated.

THE "MICROCONTROLLER-CONTROLLED ELECTRONIC DEVICE FOR THE PRODUCTION OF SPECIAL EFFECTS THROUGH THE CONTROL AND SYNCHRONIZATION OF LIGHT AND SOUND", in its complete version, FIG. 1 and FIG. 2, consists basically of a microcontroller 9, which has an internal program responsible for total control of the device operation, in its complete version, which control four RGB LEDs 11, arranged on the edges of its circuit board 16, which generate the lighting effects as well as also controls an MP3 player module 4, through commands sent to its serial data input 6, which generates the sound effects, synchronically with the light effects.

The MP3 player module 4 used to generate sound effects has an internal memory 1 that stores all files with those sound effects.

This module 4 also has an internal audio amplifier 2, connected to a loudspeaker 3.

The current invention device, in its full version, also has a data communication module 8, which receives commands and an audio communication module 7 that receives music and audios recorded on the user's mobile device 21, wherein both modules are controlled through a wireless connection 19 by an app installed on this user's mobile device 21, such as cellphones, tablets, etc.

The app, developed especially for the claimed electronic device, in its full version, is installed on the user's mobile device 21, such as cellphones, tablets, etc., allowing for a choice of synched light and sound effects, the sending of music and audios recorded on mobile devices, which will be played on the claimed electronic device, in its full version.

This app displays menus 20 of names, icons or numbers of each of the synched light and sound effect that the electronic device, in its full version, is capable of generating.

When the user touches one of the items on the menu 20, the app sends commands to the electronic device data communication module 8 through a wireless connection 19, in its full version, which sends them back to the microcontroller 9, which, in turn, controls, through the switching of three transistors 10, the four RGB LEDs 11 and also controls, via commands sent to its serial data input 6, the MP3 player module 4 with an internal memory 1, thus generating the chosen synched light and sound effect.

This same app also displays menus 20 of the names of songs and audios, recorded on the user's mobile device 21.

When the user touches one of the items on the menu 20, the app sends the song or audio, via a wireless connection 19, to the electronic device audio communication module 7, in its complete version, which sends it back to the MP3 player module 4, through its audio input 5, where it will be played in tandem with the audio of the chosen synched light and sound effect audio.

This wireless connection 19 enables the music and audio generated by any other app installed on the user's mobile device 21 to be sent back to the MP3 player module 4, through its audio input 5, where they will be played in tandem with the audio of the synched light and sound effects.

Figure 3:
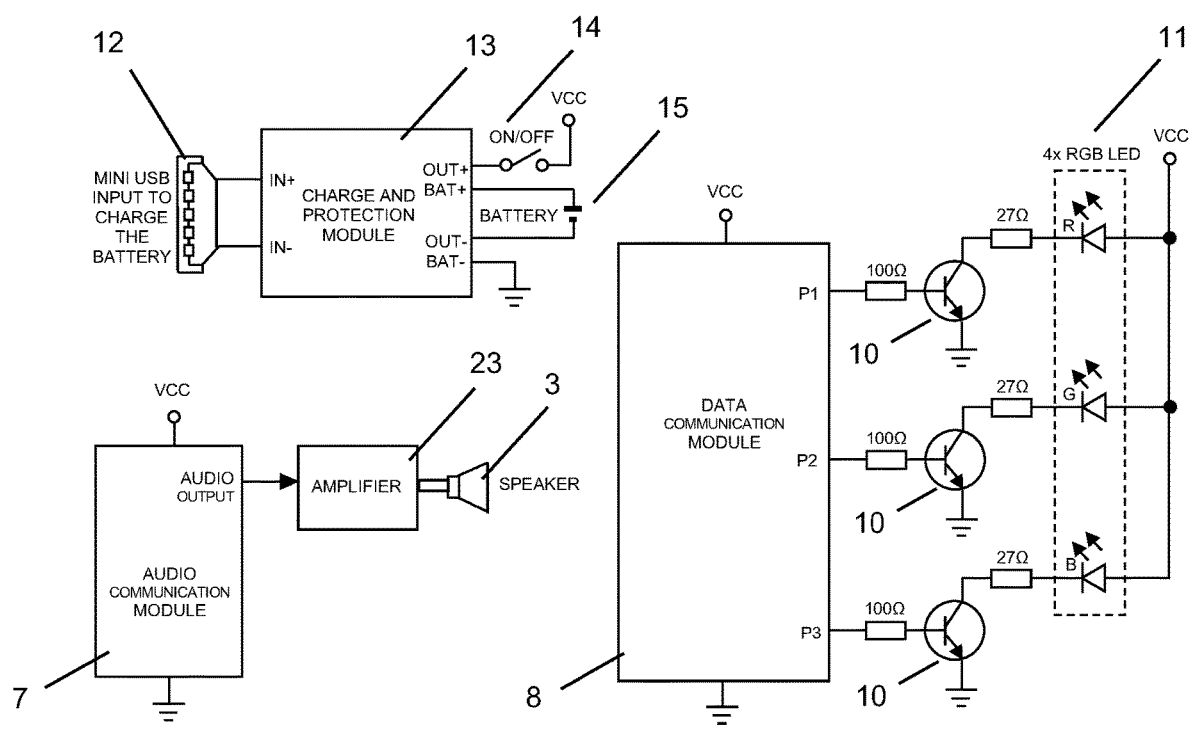
FIG. 3 represents a block diagram of the claimed electronic device, in its first simplified version, in which the data communication module switches the four RGB LEDs connected to its outputs.
Figure 4:
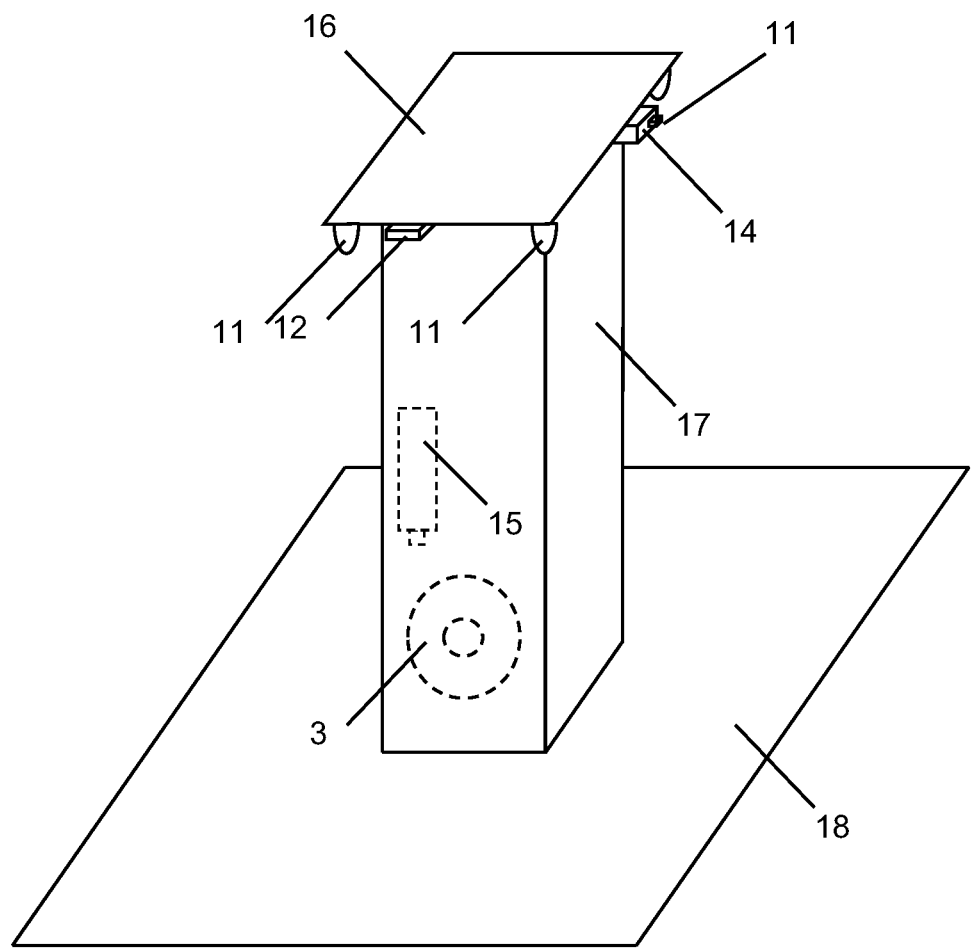
FIG. 4 represents a perspective view of the claimed electronic device, in its first simplified version, with four RGB LEDs.
Figure 5:
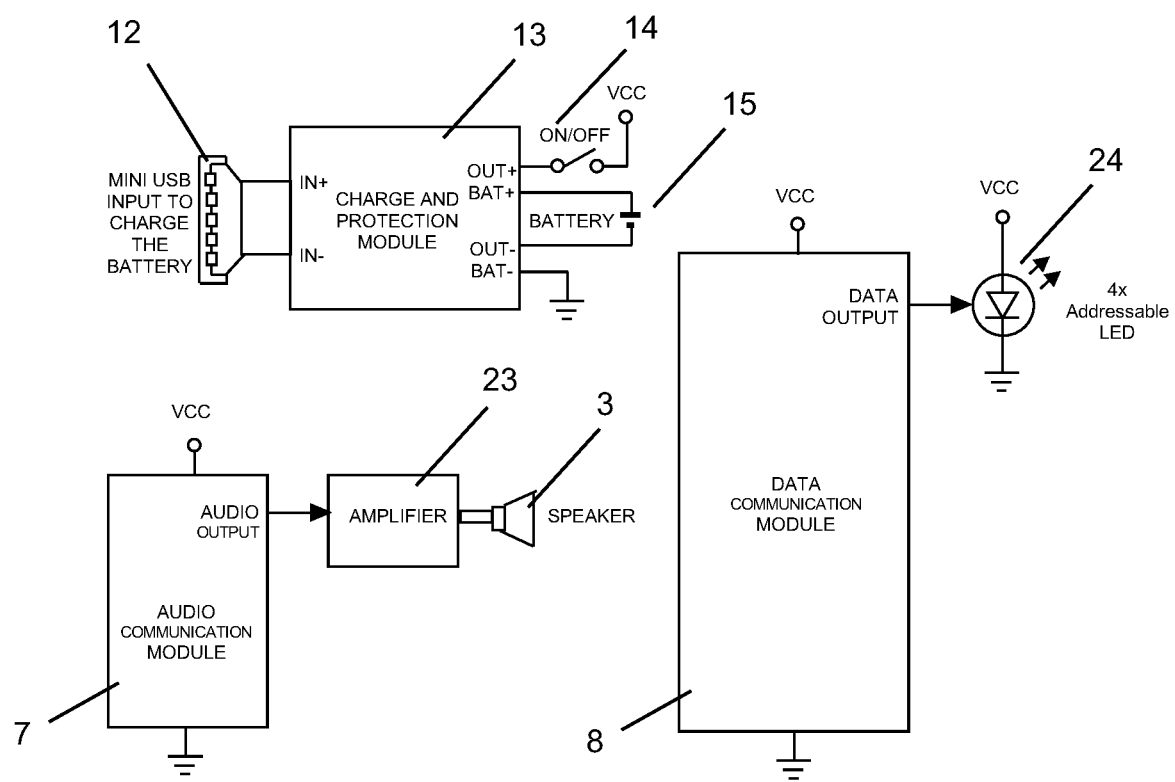
FIG. 5 represents a block diagram of the claimed electronic device, in its second simplified version, in which the data communication module sends data to the four addressable LEDs connected to its data output.
Figure 6:
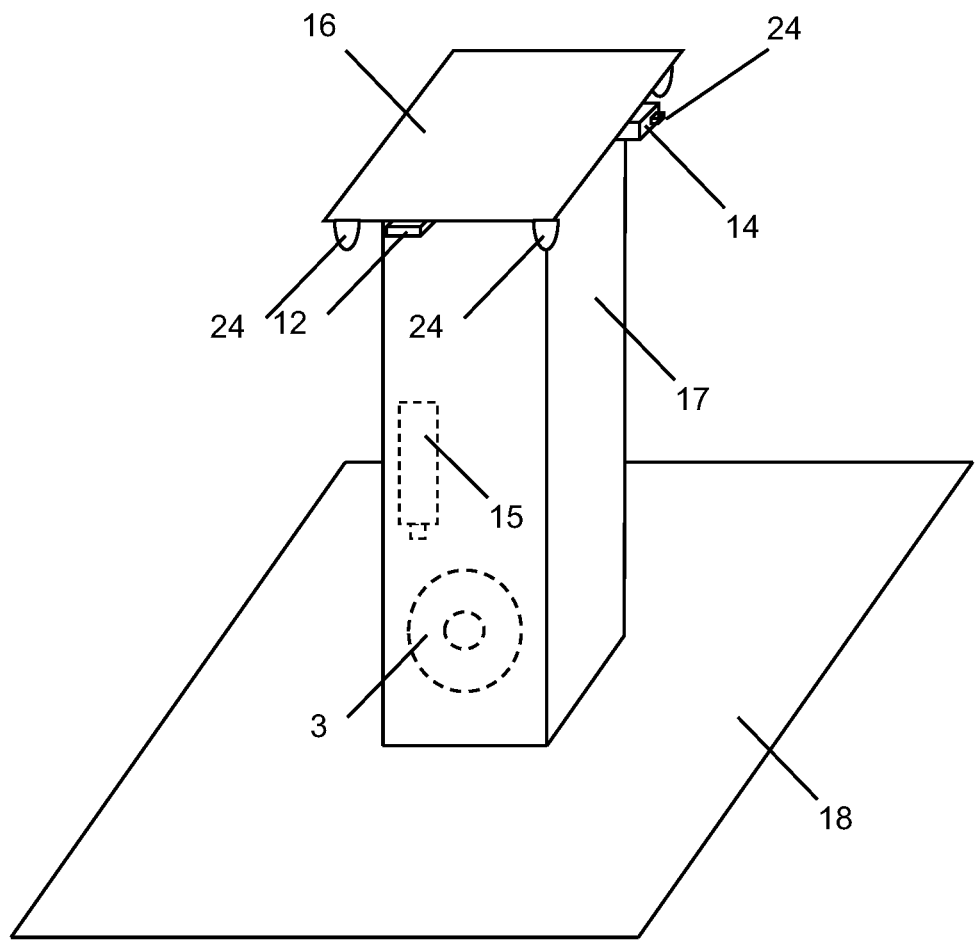
FIG. 6 represents a perspective view of the claimed electronic device, in its second simplified version, with four addressable LEDs.
Figure 7:
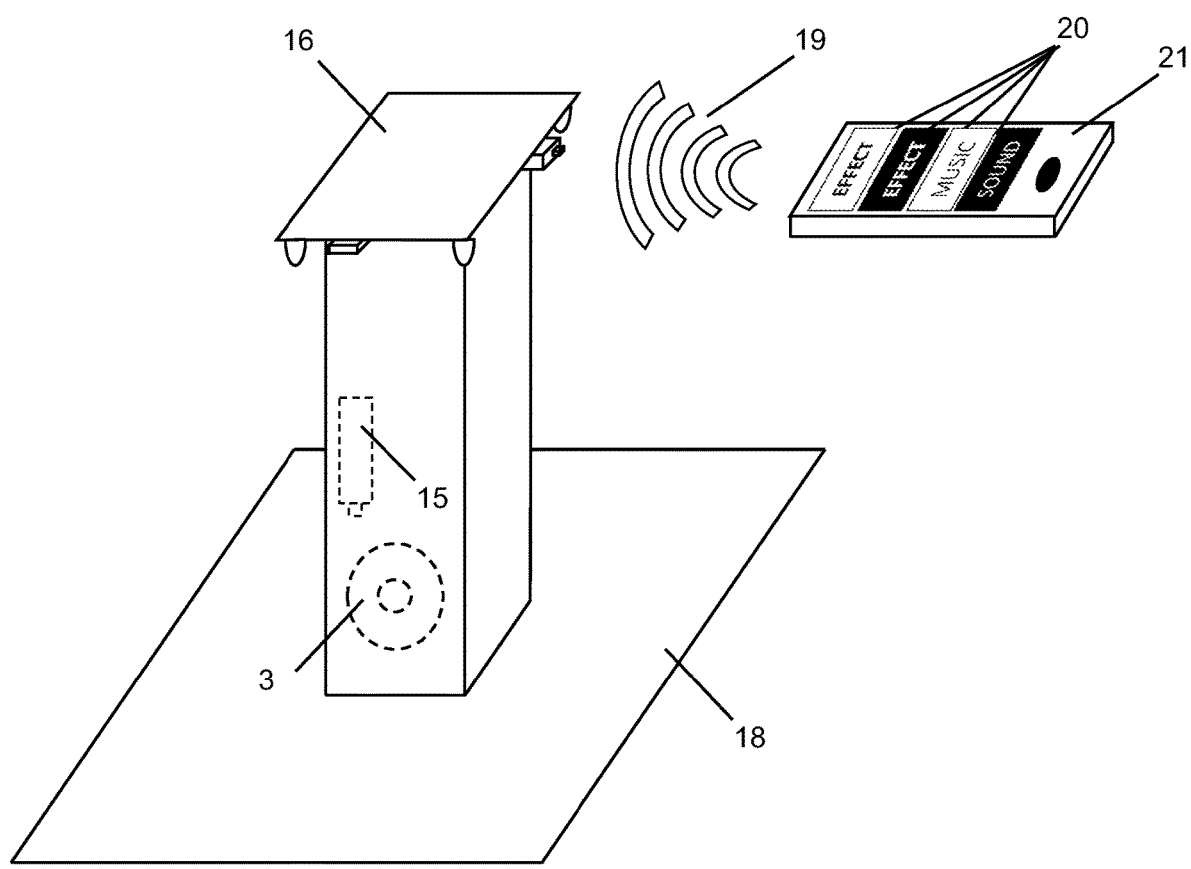
FIG. 7 depicts a mobile device, such as a cellphones, tablets, etc., sending commands, music and audios to the claimed electronic device through a wireless connection, in all its versions.
Figure 8:
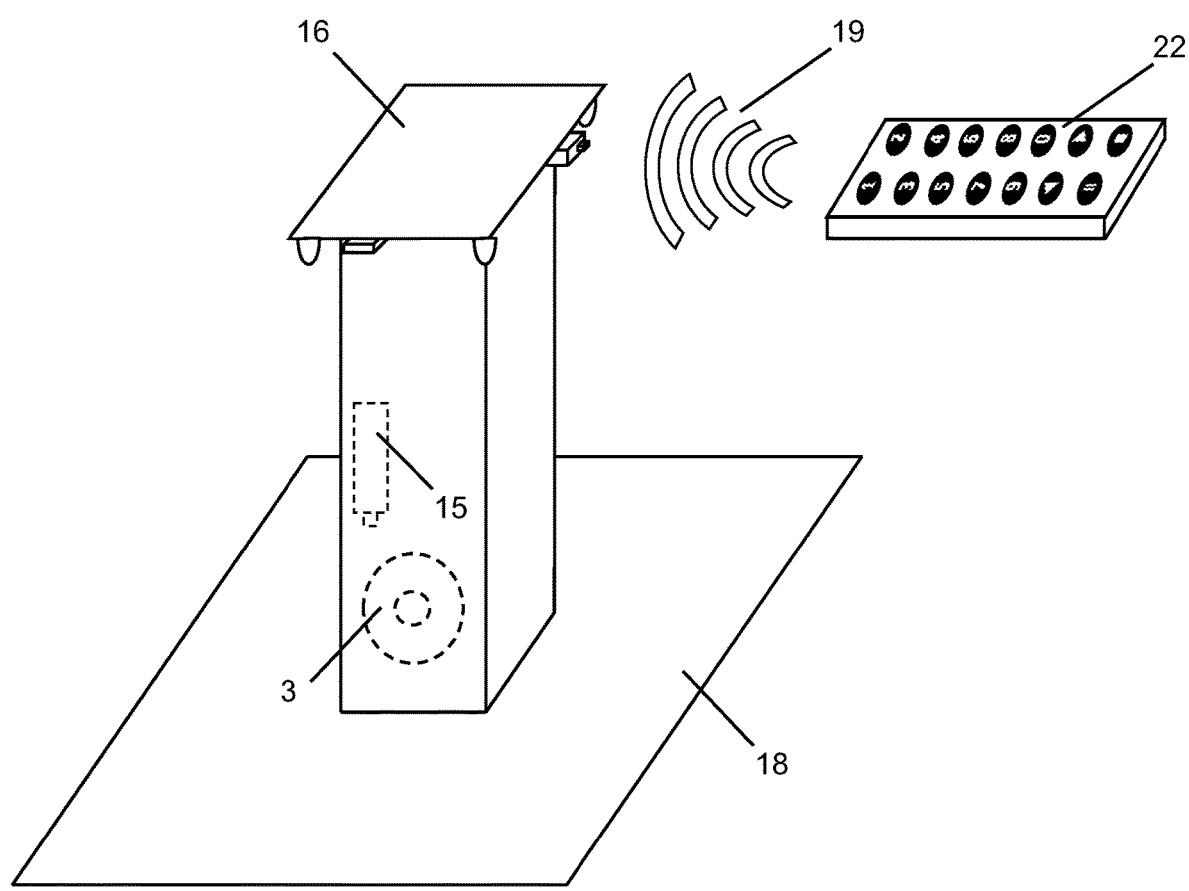
FIG. 8 depicts a remote control sending, via wireless connection, commands, music and audios to the claimed electronic device, in all its versions.

THE "MICROCONTROLLER-CONTROLLED ELECTRONIC DEVICE FOR THE PRODUCTION OF SPECIAL EFFECTS THROUGH THE CONTROL AND SYNCHRONIZATION OF LIGHT AND SOUND", in two more simplified versions of this invention, FIG. 3 and FIG. 5, in which the user's mobile device 21, through a wireless connection 19, continuously sends the data sequence corresponding to the light commands, to the data communication module 8 which, in its first simplified version, FIG. 3, will switch the four RGB LEDs 11 connected, through transistors 10, in its three digital ports, controlling the color and intensity of these RGB LEDs 11, or, in its second simplified version, FIG. 5, upon receiving the data, the communication module data 8 will then send them directly to the data input of the four addressable LEDs 24, which will immediately respond to this data sequence, changing its color and intensity, and synched with those light effects, upon receiving audio, through a wireless connection 19, the audio communication module 7 will reproduce it and send it to the audio amplifier 23 connected to a speaker 3, in both simplified versions, FIG. 3 and FIG. 5, thus generating the selected synched light and sound effect, dispensing with the microcontroller 9 and the full version mp3 player module 4, FIG. 1, respectively, thus reducing the cost of the claimed device, in its complete version.

In these two simplified versions, FIG. 3 and FIG. 5, all synched light and sound processing, music and full control of the claimed device is done through a wireless connection 19, by the app developed for the claimed device, in its simplified versions, installed on mobile devices 21, such as cellphones, tablets, etc . . . , with a disadvantaged higher battery consumption of the claimed device, in its simplified versions, and of the mobile device 21 and the need for a continuous and stable wireless connection 19 between the claimed device, in its simplified versions, and the mobile device 21, which if interrupted, brings the claimed device synched light and sound effects, in its simplified versions, to a halt.

According to FIG. 1 to FIG. 8, the present invention device, in its all versions, is powered by a charge and protection module 13 connected to a rechargeable battery 15, thus enabling the battery 15 to be recharged, even when the claimed device, in all its versions, is in operation.

This charging and protection module 13 also protects the battery 15 from possible short-circuits and charges it when its mini USB port 12 is connected to a USB charger or a USB port on a computer.

The current invention device, in its all versions, is turned off by means of a simple switch 14 connected to the this charge and protection module output 13.

According to FIG. 2, FIG. 4, FIG. 6 to FIG. 8, the current invention device circuit board 16, in all its versions, is fitted on top of a structure 17 that supports and stands approximately 25 centimeters above the surface 18 which will illuminate (a game board, a game of cards, etc . . . ). And it is in this structure 17 where both the speaker 3 and the battery 15 are attached to.

Addressable LED 24 is an RGB LED that has an internal microcontroller, which controls the color and intensity of the LED when receiving commands by means of its serial data port, which can be replaced by the addressable LED module, when this microcontroller is assembled externally to the RGB LED.

The audio communication module 7 and the data communication module 8, are both modules that use wireless connection technologies 19, such as: Bluetooth, WIFI, Zigbee, infrared, radio frequency, or any other type of wireless communication 19.

Mobile devices 21, such as cellphones, tablets, etc . . . , with apps developed to control the device, in all their versions, can be replaced, although with an economical disadvantage, by a remote control 22, developed for this device, in all its versions.

What is claimed is:

1. An electronic device to produce synchronized light and sound effects, the electronic device comprising:
    a built-in microcontroller that controls a color and an intensity of the light generated by the electronic device;
    an audio player that simultaneously generates the sound effects synchronized with the color and the intensity of the light, thereby generating the synchronized light and sound effects;
    a wireless audio transfer circuit which enables both sounds and a music to be played jointly and independently of the synchronized light and sound effects;
    a remote controller which enables the electronic device to be controlled directly and solely by a user; and
    an eclectic charge protector to enable an internal battery to be safely recharged.

2. The electronic device according to claim 1, wherein the synchronized light and sound effect are selected from the group including lightning, thunder, rain, matchstick being streaked, flickering candle, camera flash and shutter, or a combination thereof.

3. The electronic device according to claim 1, wherein the light generated by the electronic device includes a RGB LED or a plurality of RGB LEDs, an addressable LED or a plurality of addressable LEDs, a set or a plurality of sets containing a green LED, a red LED, and a blue LED in each set, or one set or a plurality of sets containing a green lamp, a red lamp and a blue lamp in each set.

4. The electronic device according to claim 1, wherein the built-in microcontroller manages the color and the intensity of the light, and simultaneously also manages an audio player that generates the sounds in the synchronized light and sound effects.

5. The electronic device according to claim 4, wherein the built-in microcontroller manages the color and intensity of the light by switching on and off RGB LEDs or sending a data stream to an addressable LED data port.

6. The electronic device according to claim 1, further comprising:
    a wireless data transfer circuit to enable a user to control the electronic device by a wireless connection.

7. The electronic device according to claim 6, wherein the wireless data transfer circuit is controlled by a
    user through a mobile device in which the user will select the synchronized light and sound effects available on an app menu developed for the electronic device.

8. The electronic device according to claim 6, wherein
    the user controls the electronic device with a remote control in which the user selects the synchronized light and sound effects with the remote control.

9. The electronic device according to claim 6, wherein the wireless data transfer circuit comprises a technology selected from the group including Bluetooth, WIFI, Zigbee, infrared, optical, electrical, radio, electromagnetic signals, acoustic signals, or a combination thereof.

10. The electronic device according to claim 1, further comprising:

a wireless audio transfer circuit that enables both the sounds and the music generated by an app installed on a mobile device of a user to be played jointly and independently of the synchronized light and sound effects.

11. The electronic device according to claim 10, wherein the wireless audio transfer circuit uses a technology selected from the group including Bluetooth, WIFI, Zigbee, infrared, optical, electrical, radio, electromagnetic signals, acoustic signals, or a combination thereof.

12. The electronic device according to claim 1, wherein a first number of synchronized light and sound effects is programmed within the electronic device and a second number of synchronized light and sound effects is programmed within an app developed exclusively for the electronic device.

13. The electronic device according to claim 1, wherein the electronic device is positioned so that the light illuminates a game surface by variations of the color and intensity of the light.

14. An electronic device to produce synchronized light and sound effects, the electronic device comprising:
   a wireless data transfer circuit to receive data sequences corresponding to light commands from an app in a mobile device of a user of the electronic device in order to generate the light effects;
   a wireless audio transfer circuit to generate the sound effects synchronized with a color and the an intensity of the light, thereby generating the synchronized light and sound effects; and
   an electric charge protector to enable an internal battery to be safely charged.

15. The electronic device according to claim 14, wherein the wireless data transfer circuit manages a color and an intensity of the light by switching on and off RGB LEDs or sending a data stream to an addressable LED data port.

16. The electronic device according to claim 14, wherein the synchronized light and sound effects are programmed within the app.

17. The electronic device according to claim 14, wherein the electronic device is positioned so that the light illuminates a game surface by variations of the color and the intensity of the light.

18. The electronic device according to claim 17, wherein an operation of the electronic device is independent of a game rule, the electronic device being capable of operation without requiring a reconfiguring, a reprogramming or an adapting of the claimed device.

* * * * *